US 6,686,323 B2

(12) United States Patent
Nilsson et al.

(10) Patent No.: US 6,686,323 B2
(45) Date of Patent: Feb. 3, 2004

(54) SURFACTANT COMPOSITIONS FOR WELL CLEANING

(75) Inventors: Frederik Nilsson, Paris (FR); Sylwia Komocki, Chatenay-Malabry (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/170,795

(22) Filed: Jun. 12, 2002

(65) Prior Publication Data

US 2003/0008803 A1 Jan. 9, 2003

(30) Foreign Application Priority Data

Jun. 12, 2001 (EP) .............................. 01401524

(51) Int. Cl.$^7$ ................................ C09K 3/00
(52) U.S. Cl. .................. 510/188; 510/365; 510/417; 510/470; 510/505; 507/211; 507/261; 507/927
(58) Field of Search ................ 510/417, 470, 510/421, 505, 422; 507/211, 261, 927; 134/38, 40

(56) References Cited

U.S. PATENT DOCUMENTS

| 5,374,361 A | * | 12/1994 | Chan | 507/211 |
| 5,605,651 A | * | 2/1997 | Balzer | 424/401 |
| 5,830,831 A | * | 11/1998 | Chan et al. | 507/211 |
| 5,874,386 A | | 2/1999 | Chan et al. | 507/211 |
| 6,234,183 B1 | | 5/2001 | Chan et al. | 134/22.1 |

FOREIGN PATENT DOCUMENTS

| WO | 94/21655 | 9/1994 |
| WO | 96/29977 | 10/1996 |
| WO | 96/34078 | 10/1996 |
| WO | 99/21948 | 5/1999 |

* cited by examiner

Primary Examiner—Gregory Webb
(74) Attorney, Agent, or Firm—Thomas O. Mitchell; Catherine Menes; Brigitte Jeffery

(57) ABSTRACT

A surfactant composition for use in well treatment, particularly for removing oil-based mud deposits from a well prior to cementing, comprises an alkylpolyglucoside in a solution of a mutual solvent for water and hydrocarbon. The composition can be used to formulate a chemical wash by dissolving the composition at a concentration of about 1%–10% (e.g. 5%) by weight in water or brine.

11 Claims, 13 Drawing Sheets

SURFACTANT COMPOSITIONS FOR WELL CLEANING

The present invention relates to surfactant compositions, in particular surfactant compositions for use in cleaning oil wells or the like. The invention also comprises methods of cleaning or treating a well as part of a cementing operation.

In the drilling of a well such as an oil or gas well, a drilling fluid, often called "mud" is used to transport drilled material back to the surface and to provide support to the well and to balance the pressure of fluids in the formation through which the well is drilled. These fluids are typically suspensions of solid particulate materials including clays such as bentonite and heavy minerals such as barite in a liquid continuous phase, usually water or brine. These particulate materials provide the fluid with appropriate viscosity and thixotropic behaviour to ensure that drilled cuttings are transported to the surface and with appropriate density to balance the pressure of the formation fluids and prevent influxes. Other materials often included are fluid-loss control materials. In certain cases, fluid will tend to pass from the well into the porous and permeable rock surrounding the well due to a higher hydrostatic pressure of the fluid in the well compared to the fluids in the formation which can occur from time to time. This is often called "invasion" and is undesirable since the drilling fluid displaces the formation fluids and creates a barrier to flow of the formation fluids into the well when it is completed and allowed to produce hydrocarbons. Fluid-loss control agents are particulate materials that are allowed to build up on the wall of the well to create a solid barrier to the flow of fluid into the formation. In fact, such a layer will often form from the normal drilling fluid solids (bentonite, barite, drilled materials, etc.) and is often called "mudcake". In many cases, gelled mud deposits can form on the walls of the well (or on top of the mudcake), or on casing or other tubulars in the well.

From time to time in the drilling of a well, it is necessary to cement a steel casing into the well to provide physical support for the well and to provide isolation between the various fluid-containing zones of the formation penetrated by the well. In order to do this, the casing is positioned in the well and cement pumped down the casing and allowed to rise up the outside and fill the annulus between the outside of the casing and the wall of the well. In order to provide effective zonal isolation, it is necessary that the cement makes a good bond with the wall and the presence of mudcake can interfere with, or completely prevent this from occurring. Therefore, it is necessary to make sure that mudcake and gelled deposits are removed from the wall before the cement is placed. Gelled fluid deposits can be removed using a "wash" fluid which is pumped through the casing and annulus and scratchers or other such tools can be used to remove mudcake if required (other fluids such as spacers are also pumped to ensure removal of drilling fluids before cementing commences).

Certain wells are drilled using oil-based drilling fluids ("oil-based muds" or "OBM") in which a hydrocarbon is used as the continuous liquid phase other components being present in the form of an emulsion. Examples of situations where OBM might be used as when drilling through formations that swell in contact with water or are eroded quickly in contact with water. Another situation is where the well is deviated from vertical and contact between the drill string and the wall of the well is extensive and lubrication is required. The main advantages of using OBM when drilling are, better stability of the bore hole is achieved as no or little leaching of the formation occurs, better lubrication, and better cooling of the drilling bit. OBMs can provide particular problems in cementing since removal of mud deposits can be difficult. As cement slurries are usually aqueous. Removal of gelled OBM is important to ensure water-wet surfaces in the well to allow a good bond with cement. Most oil-base drilling fluids are incompatible with aqueous cement slurries. Commingling of the mud and the cement slurry can result in the build-up of an unpredictable and viscous sludge at the mud/cement interface which can cause serious problems as a consequence of the increased displacement pressure required for circulation. Possible consequences of such a viscous sludge can be, among others, lost circulation, cement bypassing the mud leading or contamination of the cement by the mud. Contamination of the cement by mud in particular can result in unpredictable thickening time (flash set) or set properties of the cement that in the worst case may lead to a major operation failure (MOF).

As with water-based muds, some of the problems associated with the use of OBM can be addressed using a chemical wash, a fluid with a density and a viscosity close to water. Chemical washes assist mud removal by thinning, dispersing and emulsifying the mud when pumped ahead of a spacer or cement slurry. These chemical washes often include surfactants to assist in their operation. One type of surfactant that has been proposed for use in such wash fluids is an alkyl(poly)glucosides ("APG"). Examples of APGs and their use in oil well applications, particularly chemical washes can be found in U.S. Pat. Nos. 5,374,361; 5,548,197; 5,830,831; 5,977,032; 5,996,692; 6,000,412; 6,090,754; 6,110,885; 6,112,814; 6,120,199; 6,130,199 and EP 817, 605. Certain APG compositions are disclosed in WO 99/21948; WO 96/34078 and WO 94/21655.

It is an object of the present invention to provide a surfactant composition that is suitable for well-related applications, particularly for use as a chemical wash for use with OBMs in well cementing operations.

In accordance with one aspect of the present invention, there is provided a surfactant composition comprising an alkylpolyglucoside in a solution of a mutual solvent for water and hydrocarbon.

One particular composition comprises at least one linear or branched chain $C_6$–$C_{10}$ APG. Particularly preferred APGs are $C_8$–$C_{10}$ linear and branched chained APGs, $C_8$ branched chain APGs, and linear $C_6$ APGs. These APGs can be used in isolation or in combination. The APGs can be used in a solution of a mutual solvent such as isopropyl myristate (IPM) or rapeseed methyl ester (RME) or the like. A typical ratio of surfactant(s) to mutual solvent is in the range 1:3 to 3:1.

The composition can be used to formulate a chemical wash by dissolving the composition at a concentration of about 1%–10% (e.g. 5%) by weight in water or brine. This wash can be used before placement of a cement in a well to remove OBM deposits from the wall of the well. The washes are applicable to various types of OBM, e.g. linear α olefins, low toxicity oils and esters. A wash of this type can be preceded by the use of APG and/or mutual solvent as a dilutant for drilling muds or in spacer fluids.

The present invention is considered particularly useful in providing a water-wet surface in the well or on casing so as to allow a good cement bond to form.

The present invention will now be described by way of examples, with reference to the accompanying drawings, in which.

The following method was used to test the surfactant compositions to obtain the data for FIGS. 1–25:

The cleaning efficiency of the surfactants/solvents are tested using OBMs prepared according to standardized procedures including aging by "hot rolling" at 185° F. (85° C.) during 16 hours using pressurized mud "bombs".

A 60 mesh metallic grid is used to cover the normally smooth surface of a Chan/Fann 35 rotor and to create a rough surface to which the OBM can adhere. The rotor and metallic grid are weighed to obtain $W_1$. The Chan/Fann 35 is set up as normally done for an API standardized rheology measurement except that the "bob" is not used.

The rotor with the metallic grid is lowered into to the OBM so that it just covers the metallic grid part. The rotor with the metallic grid is left in the OBM under static condition for 10 minutes. When taken out, a smooth and homogenous layer of OBM covers the metallic grid. The rotor is left for 2 minutes so that any excess OBM can drip off. Finally the bottom surface is gently wiped clean. The rotor, grid and OBM are weighed upside down on a balance. The weight is noted as $W_2$.

The rotor with the metallic grid, now covered by a smooth OBM layer are placed in a preheated (to the desired test temperature) test cup containing the test solution (surfactant/water, solvent/water or solvent). The rotor is rotated at 100 rpm for 5 minutes and then taken out of the test solution. The rotor is left to drip for 2 minutes. The bottom is wiped to remove any drops hanging down but no OBM still adhering to the grid is removed.

The rotor is taken off the Chan/Fann 35 and weighed upside down on a balance. The weight is noted as $W_3$ at 5 minutes.

The rotor is now replaced in the test solution and run in an exactly same way as described above for another 5 minutes to obtain the $W_3$ value at 10 minutes. The process is repeated until $W_3$ values at 15, 20 and 30 minutes have been obtained.

The mud removal (%) is calculated using the $W_1$, $W_2$ and $W_3$ values.

In the test data listed below, surfactant A is a linear and branched $C_8$–$C_{10}$ APG (AG6210 obtained from Akzo-Nobel), surfactant B is a branched $C_8$ APG (AG6202 Akzo-Nobel),and surfactant C is a linear $C_6$ APG (Akzo-Nobel). The mutual solvents used are isopropyl myristate (IPM) and rapeseed methyl ester (RME) (ATOFINA). In each case the surfactant, mutual solvent, or surfactant-mutual solvent mixture is tested as a 5% by weight solution in water, sea water or 10% by weight NaCl brine according to the process described above.

Figure 2:
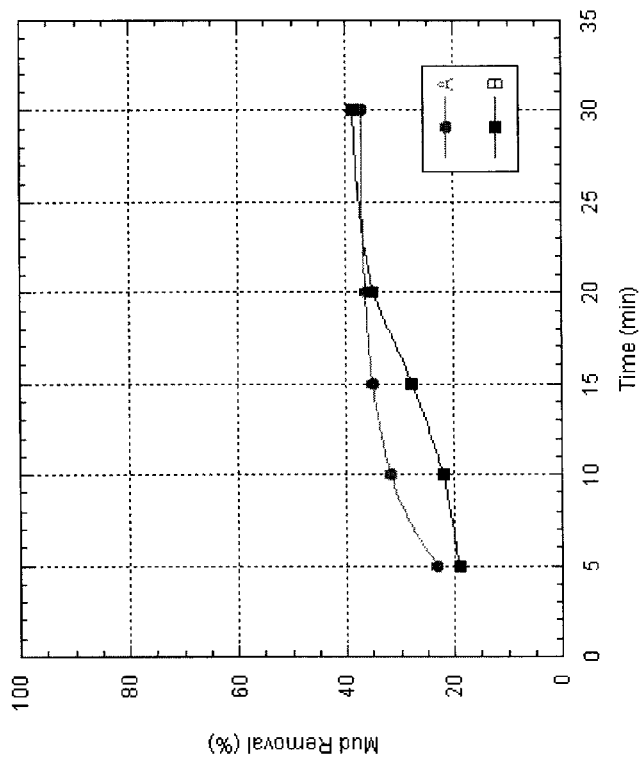
FIGS. 1–3 show the efficacy in mud removal for three different surfactants for different types of OBM
Figure 1:
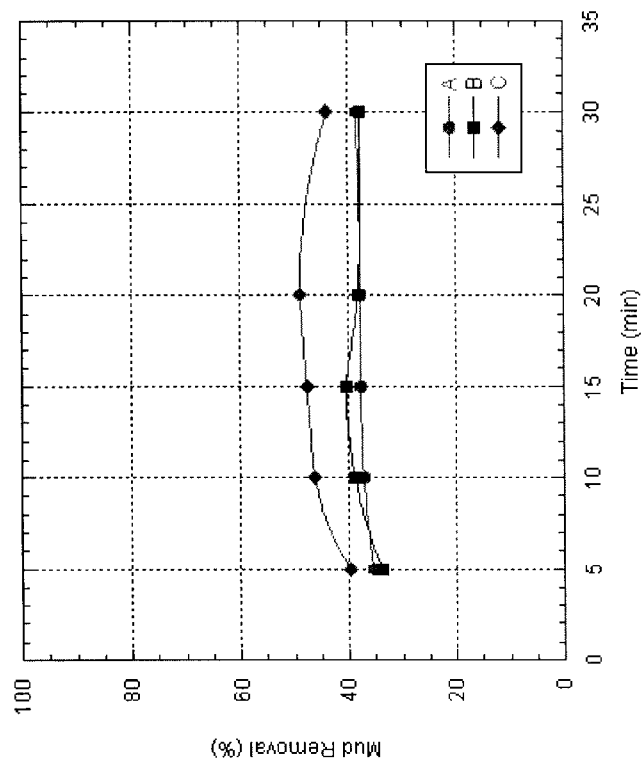
Figure 3:
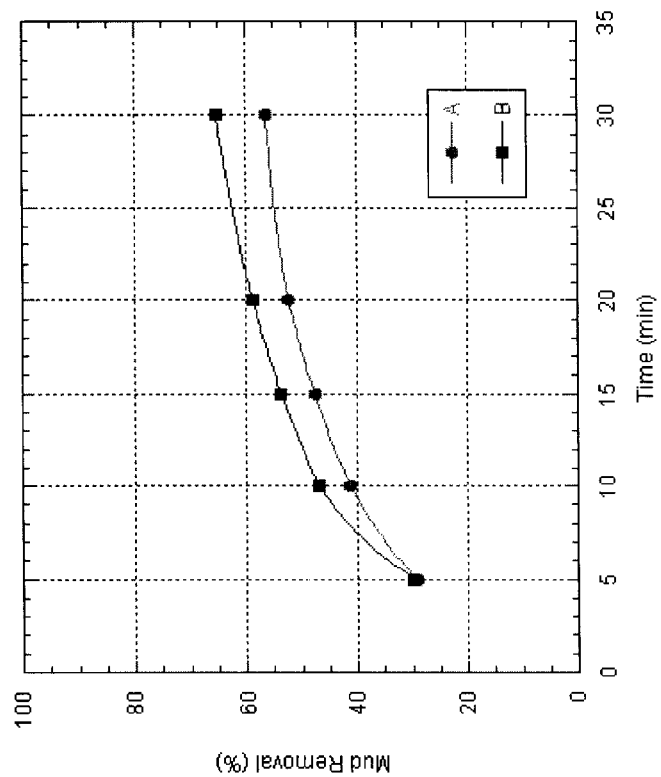

Table 1 shows the various compositions tested to provide that data of FIGS. 1–3:

TABLE 1

| FIGURE | Mutual Solvent | Surfactant | OBM base | Solution | Temp. |
|---|---|---|---|---|---|
| 1 | | A(●), B(■), C(♦) | Linear α Olefin | Water | 85° C. |
| 2 | | A(●), B(■) | Low toxic mineral oil | Water | 85° C. |
| 3 | | A(●), B(■) | Ester | Water | 85° C. |

Figure 4:
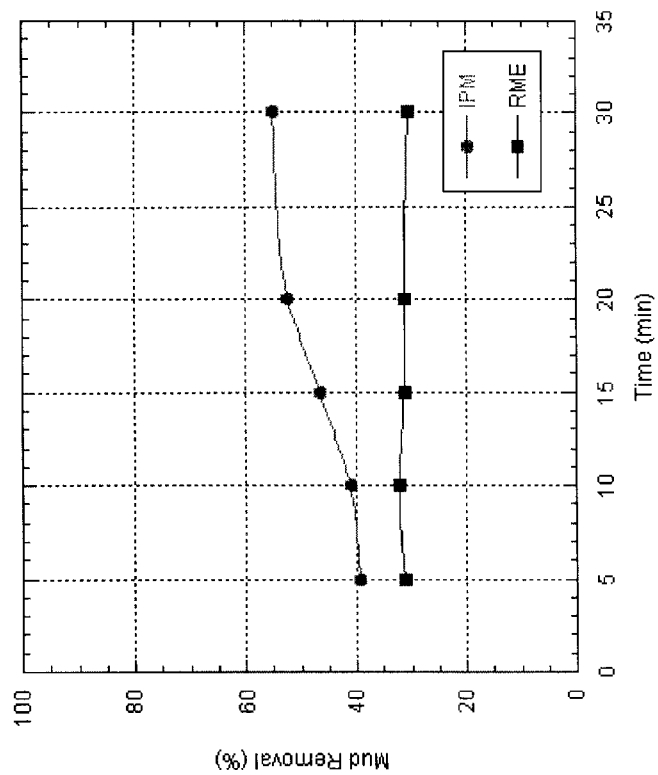
FIGS. 4–6 show the efficacy in mud removal for two mutual solvents for different types of OBM.
Figure 6:
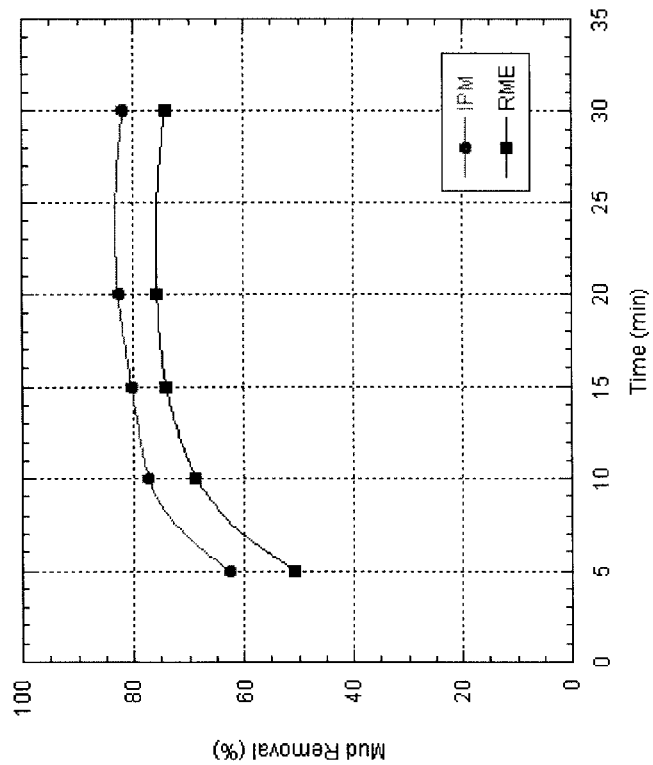
Figure 5:
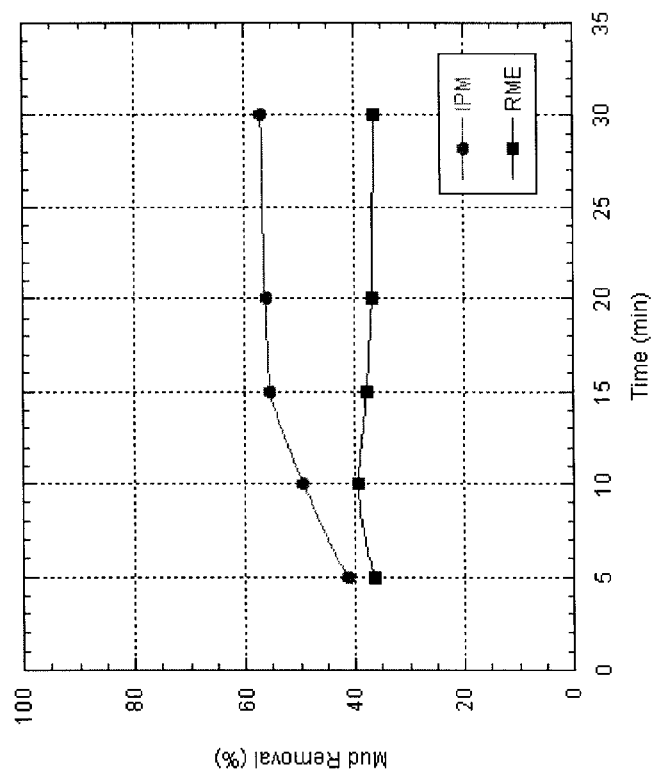
Figure 8:
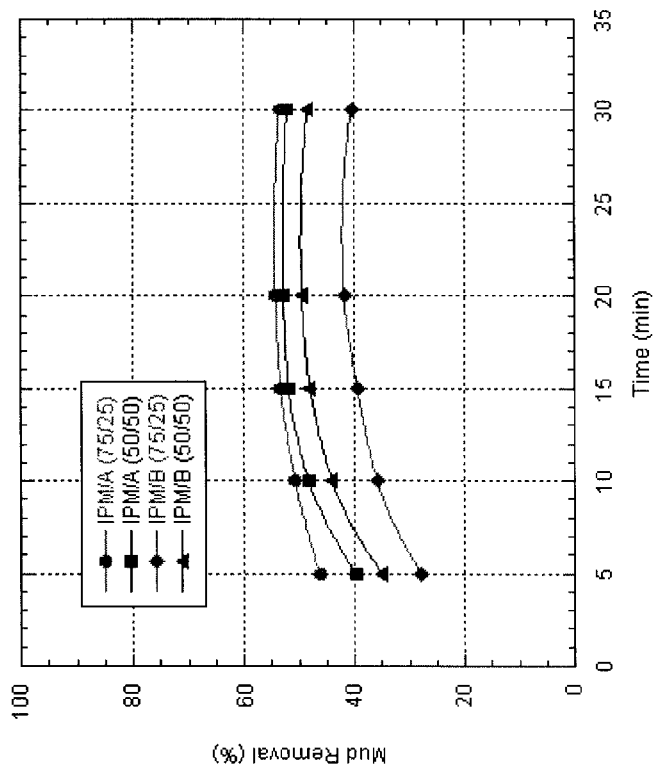
FIGS. 7–18 show the effect of changing proportions of surfactant and mutual solvent on the efficacy in mud removal for different types of OBM.
Figure 7:
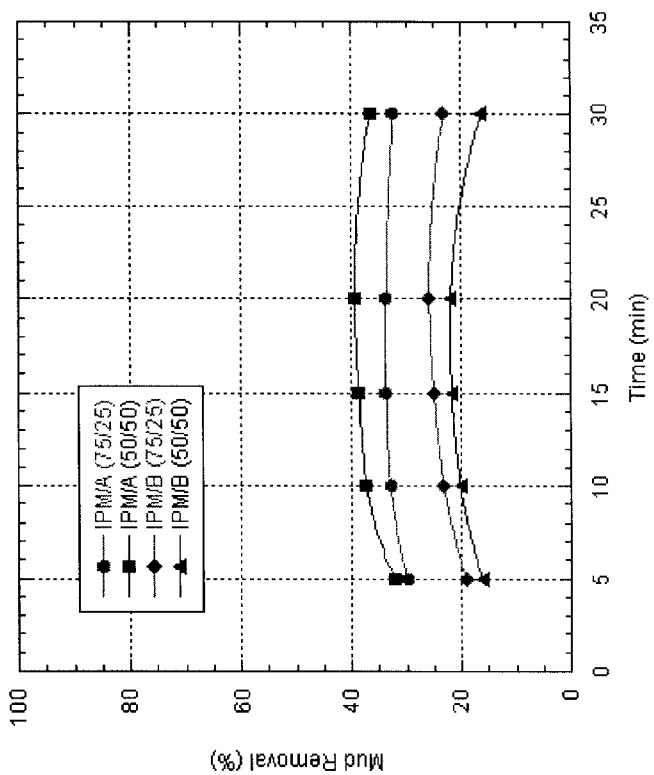
Figure 10:
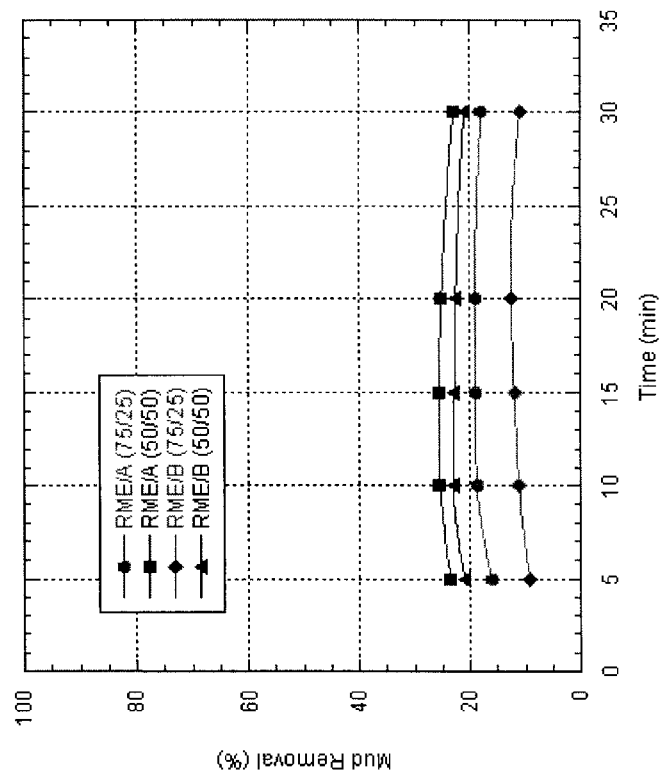
Figure 9:
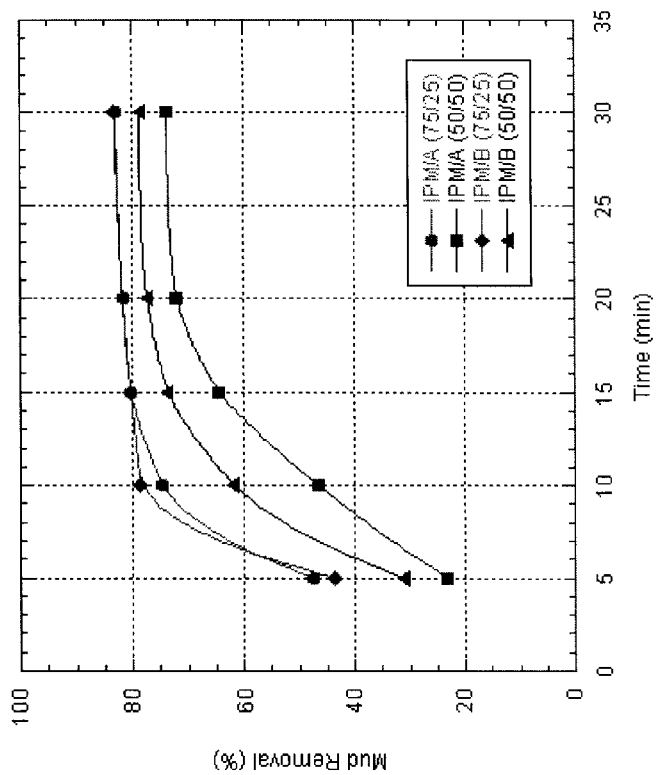
Figure 12:
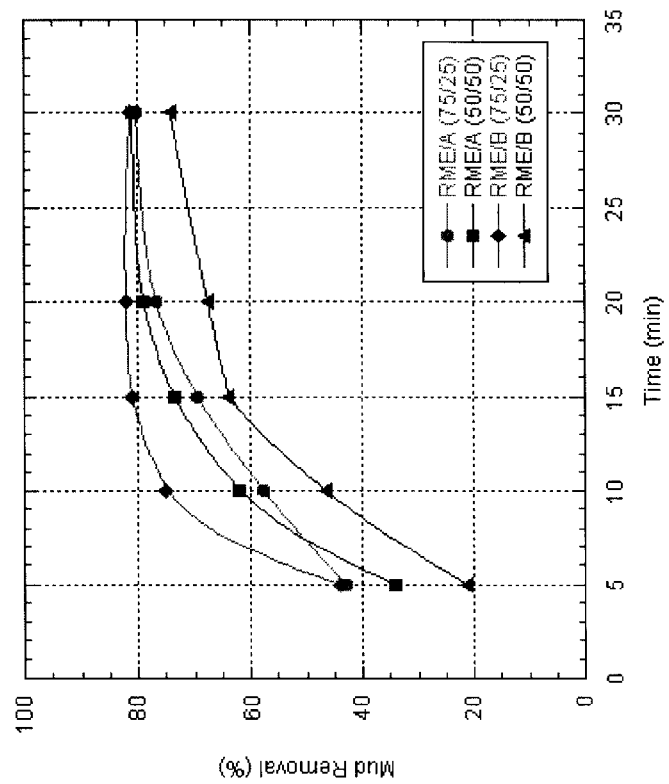
Figure 11:
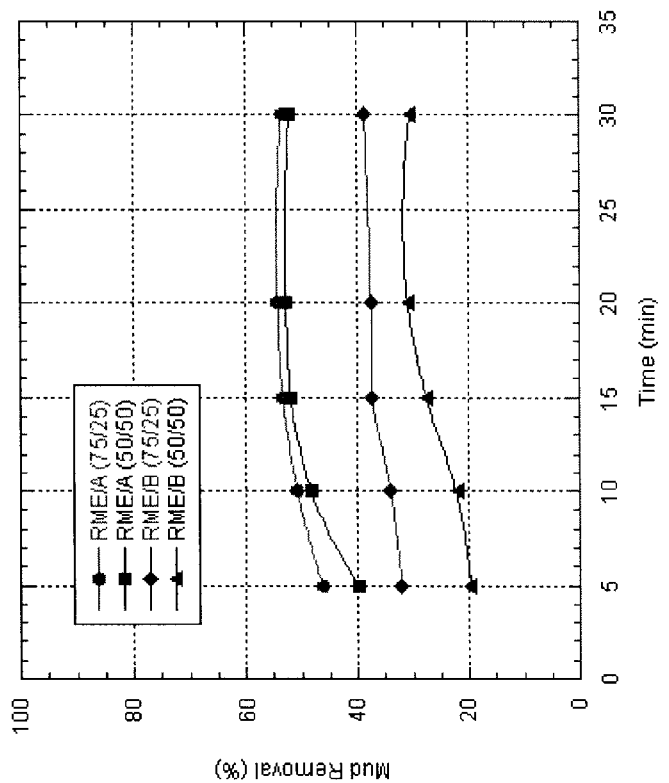
Figure 14:
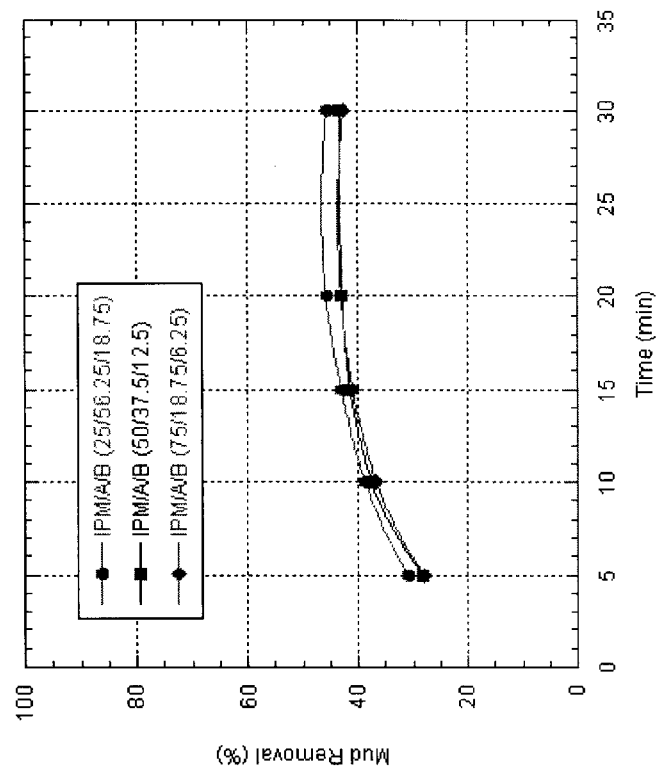
Figure 13:
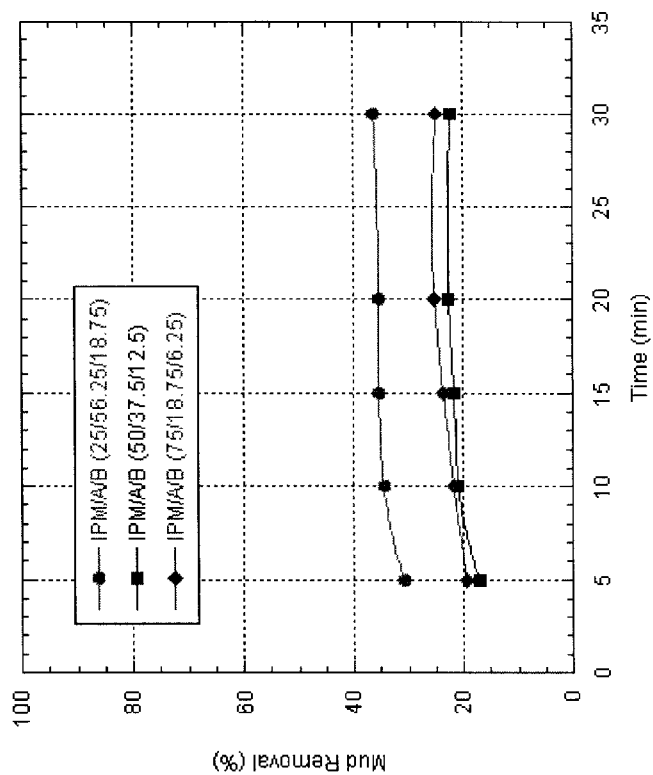
Figure 16:
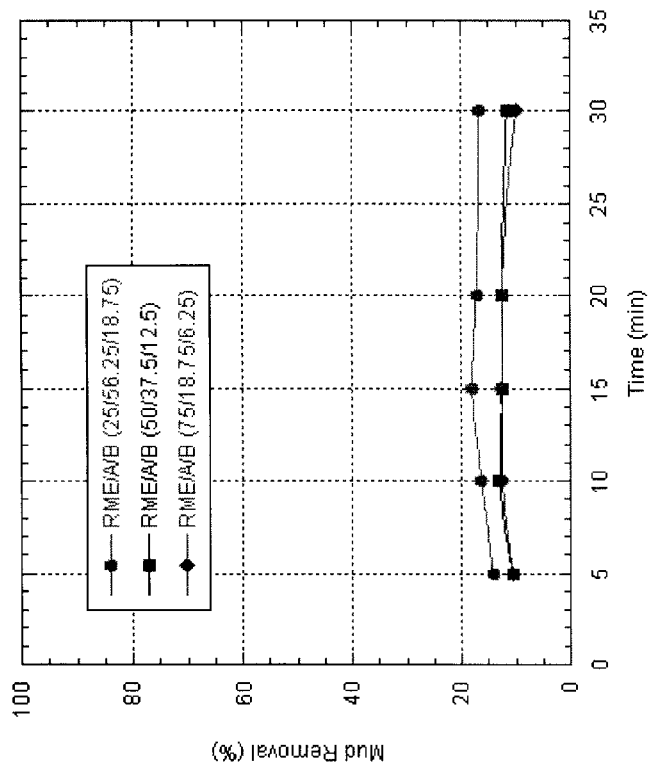
Figure 15:
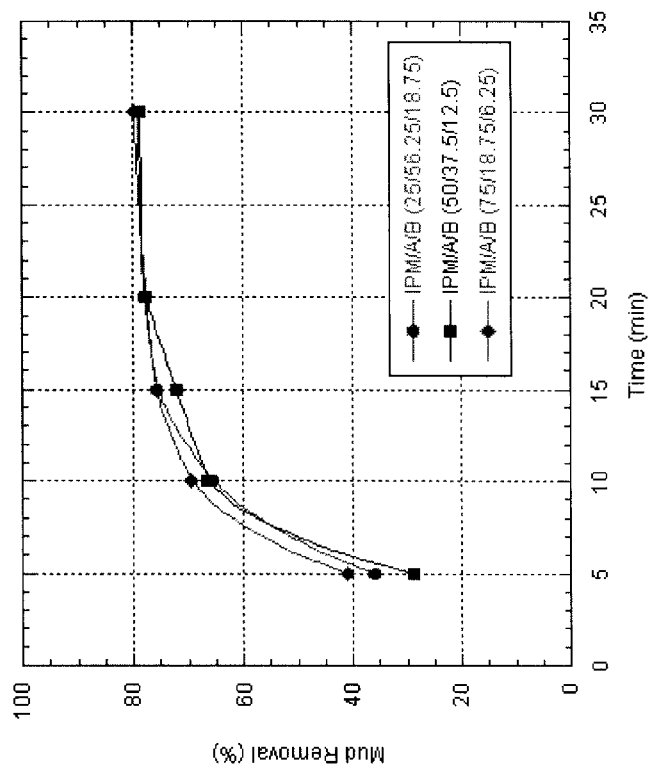
Figure 18:
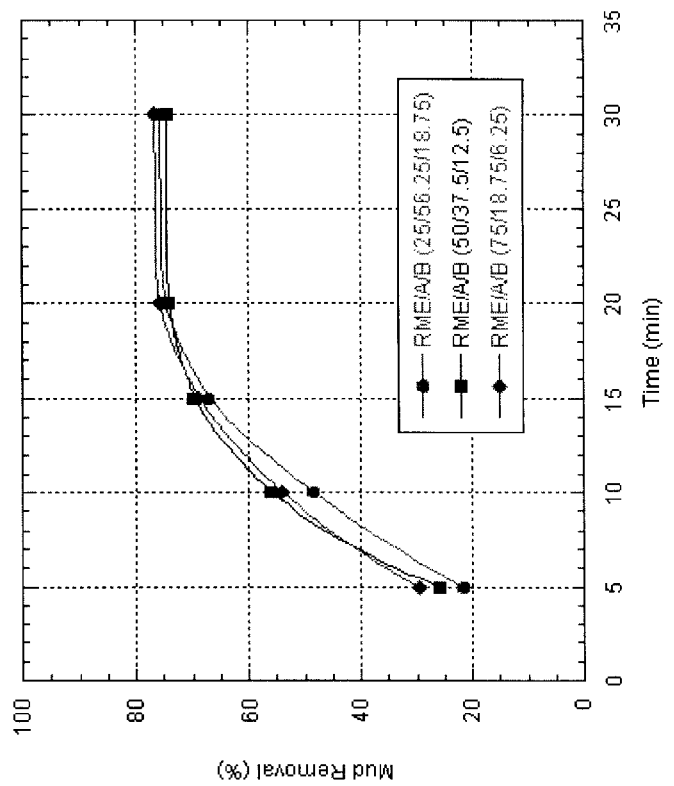
Figure 17:
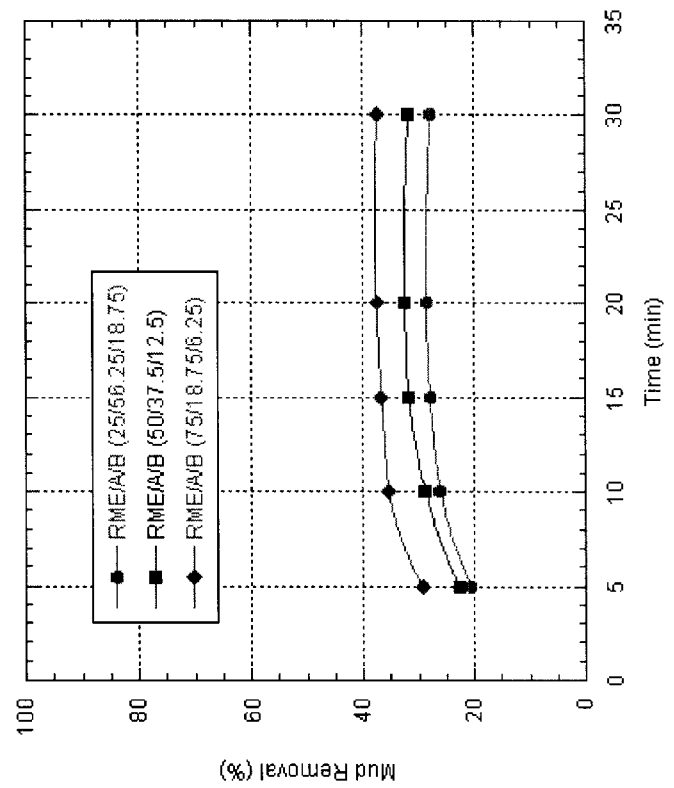

Table 2 shows the various compositions tested to provide that data of FIGS. 4–6:

TABLE 2

| FIGURE | Mutual Solvent | Surfactant | OBM base | Solution | Temp. |
|---|---|---|---|---|---|
| 4 | IPM(●), RME(■) | | Linear α Olefin | Water | 85° C. |
| 5 | IPM(●), RME(■) | | Low toxic mineral oil | Water | 85° C. |
| 6 | IPM(●), RME(■) | | Ester | Water | 85° C. |

Table 3 shows the various compositions tested to provide the data of FIGS. 7–12:

TABLE 3

| FIGURE | Mutual Solvent | Surfactant | OBM base | Solution | Temp. |
|---|---|---|---|---|---|
| 7 | (●) IPM (75%)<br>(■) IPM (50%)<br>(♦) IPM (75%)<br>(▲) IPM (25%) | A (25%)<br>A (50%)<br>B (25%)<br>B (50%) | Linear α Olefin | Water | 85° C. |
| 8 | (●) IPM (75%)<br>(■) IPM (50%)<br>(♦) IPM (75%)<br>(▲) IPM (25%) | A (25%)<br>A (50%)<br>B (25%)<br>B (50%) | Low toxic mineral oil | Water | 85° C. |
| 9 | (●) IPM (75%)<br>(■) IPM (50%)<br>(♦) IPM (75%)<br>(▲) IPM (25%) | A (25%)<br>A (50%)<br>B (25%)<br>B (50%) | Ester | Water | 85° C. |
| 10 | (●) RME (75%)<br>(■) RME (50%)<br>(♦) RME (75%)<br>(▲) RME (25%) | A (25%)<br>A (50%)<br>B (25%)<br>B (50%) | Linear α Olefin | Water | 85° C. |
| 11 | (●) RME (75%)<br>(■) RME (50%)<br>(♦) RME (75%)<br>(▲) RME (25%) | A (25%)<br>A (50%)<br>B (25%)<br>B (50%) | Low toxic mineral oil | Water | 85° C. |
| 12 | (●) RME (75%)<br>(■) RME (50%)<br>(♦) RME (75%)<br>(▲) RME (25%) | A (25%)<br>A (50%)<br>B (25%)<br>B (50%) | Ester | Water | 85° C. |

Table 4 shows the various compositions tested to provide the data of FIGS. 13–18:

TABLE 4

| FIGURE | Mutual Solvent | Surfactant | OBM base | Solution | Temp. |
|---|---|---|---|---|---|
| 13 | (●) IPM (25%)<br>(■) IPM (50%)<br>(♦) IPM (75%) | A (56.25%), B (18.75%)<br>A (37.5%), B (12.5%)<br>A (18.75%), B (6.25%) | Linear α Olefin | Water | 85° C. |
| 14 | (●) IPM (25%)<br>(■) IPM (50%) | A (56.25%), B (18.75%)<br>A (37.5%), B (12.5%) | Low toxic mineral oil | Water | 85° C. |

TABLE 4-continued

| FIGURE | Mutual Solvent | Surfactant | OBM base | Solution | Temp. |
|---|---|---|---|---|---|
|  | (♦) IPM (75%) | A (18.75%), B (6.25%) |  |  |  |
| 15 | (●) IPM (25%) | A (56.25%), B (18.75%) | Ester | Water | 85° C. |
|  | (■) IPM (50%) | A (37.5%), B (12.5%) |  |  |  |
|  | (♦) IPM (75%) | A (18.75%), B (6.25%) |  |  |  |
| 16 | (●) RME (25%) | A (56.25%), B (18.75%) | Linear α Olefin | Water | 85° C. |
|  | (■) RME (50%) | A (37.5%), B (12.5%) |  |  |  |
|  | (♦) RME (75%) | A (18.75%), B (6.25%) |  |  |  |
| 17 | (●) RME (25%) | A (56.25%), B (18.75%) | Low toxic mineral oil | Water | 85° C. |
|  | (■) RME (50%) | A (37.5%), B (12.5%) |  |  |  |
|  | (♦) RME (75%) | A (18.75%), B (6.25%) |  |  |  |
| 18 | (●) RME (25%) | A (56.25%), B (18.75%) | Ester | Water | 85° C. |
|  | (■) RME (50%) | A (37.5%), B (12.5%) |  |  |  |
|  | (♦) RME (75%) | A (18.75%), B (6.25%) |  |  |  |

Figure 20:
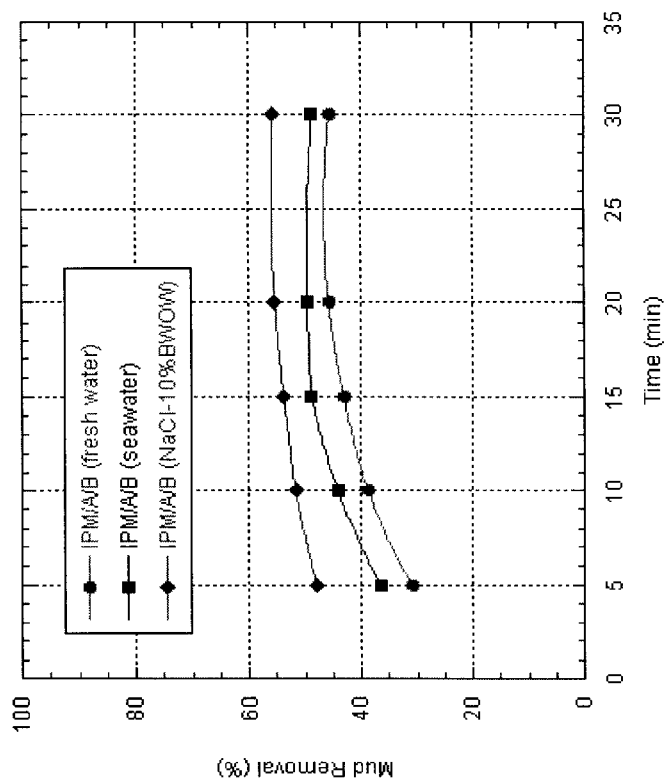
FIGS. 19–21 show the effect of using different solvents with the surfactant and mutual solvents on the efficacy in mud removal different types of OBM.
Figure 19:
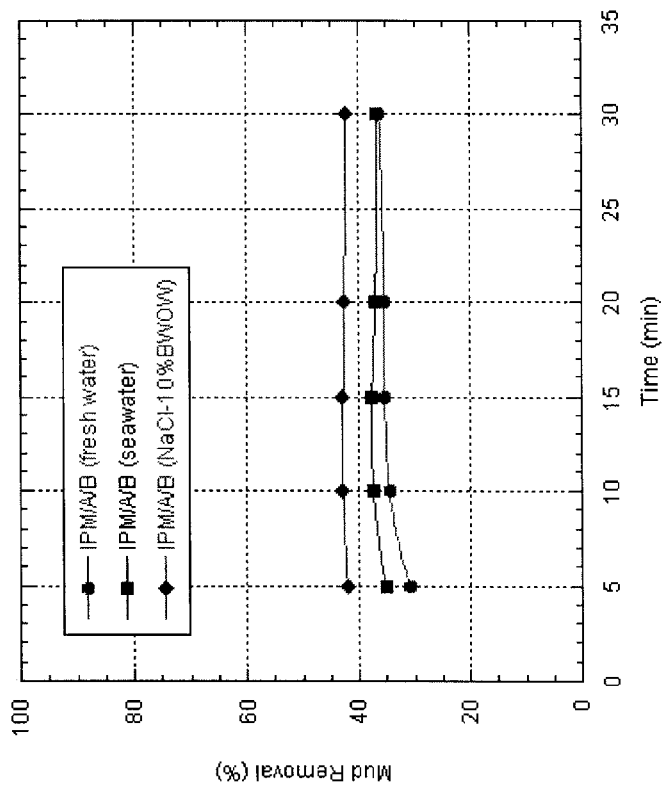
Figure 22:
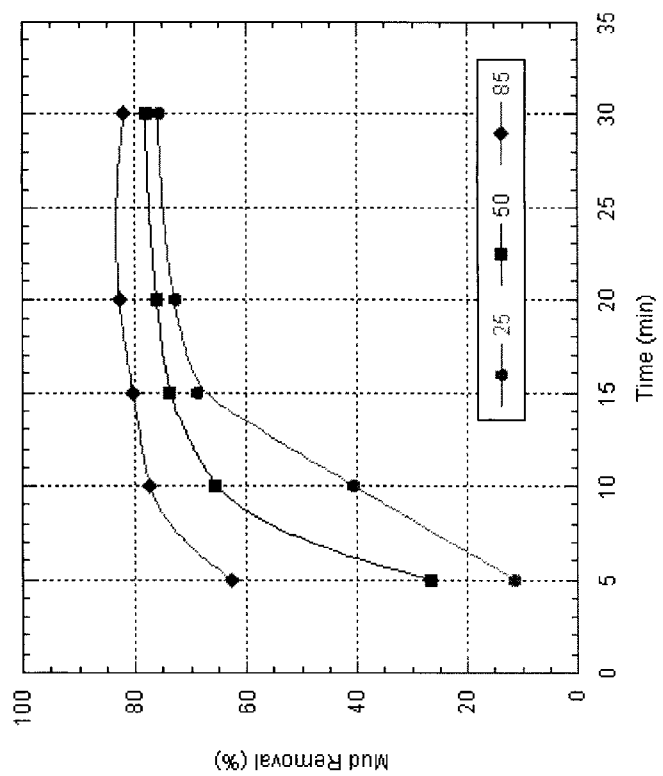
FIGS. 22–25 show the effect of changing temperature on the efficacy in mud removal.
Figure 21:
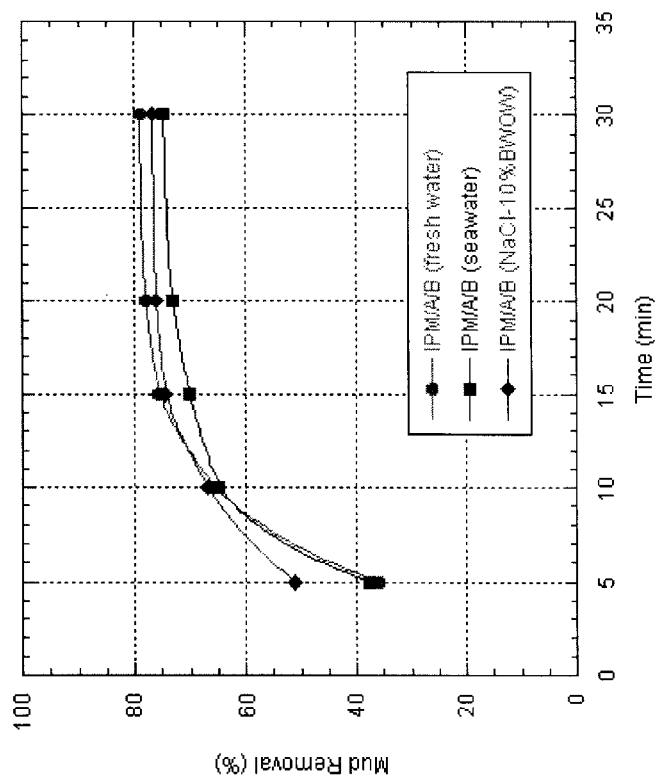
Figure 24:
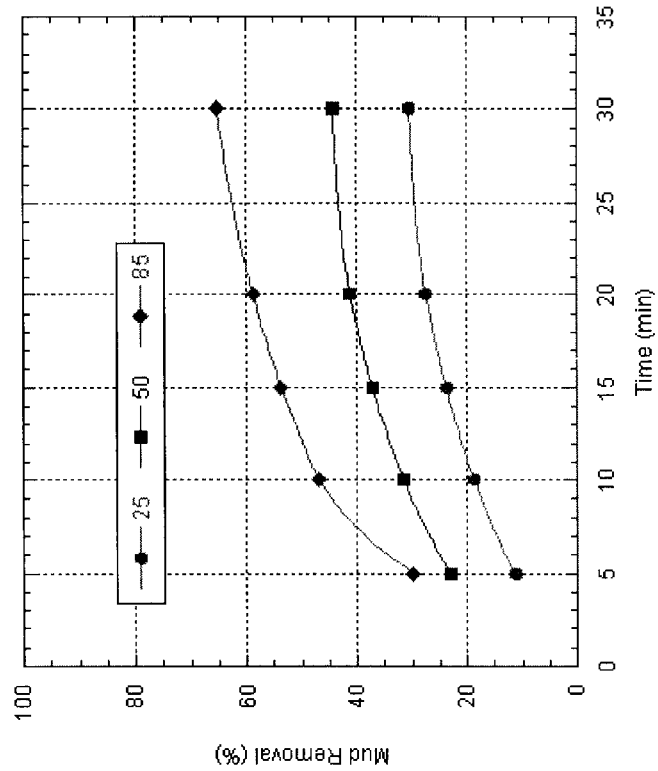
Figure 23:
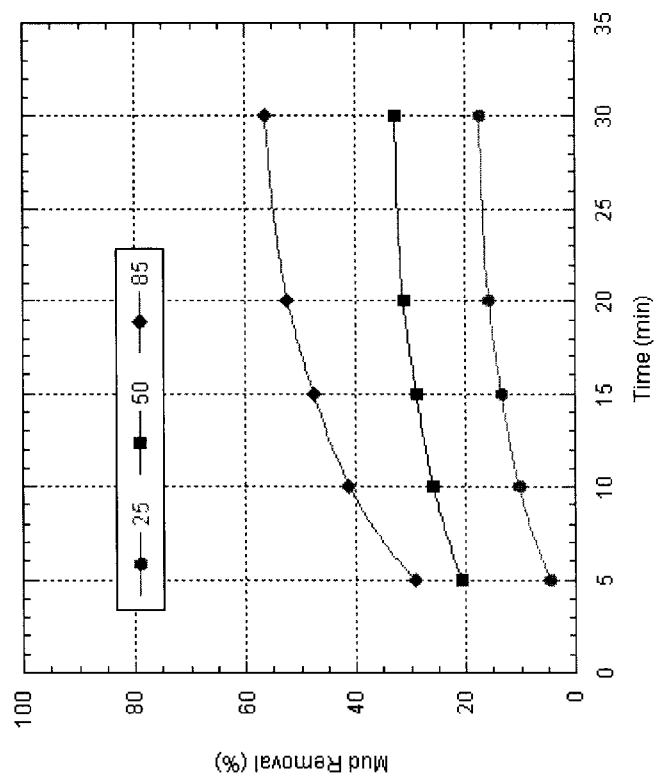
Figure 25:
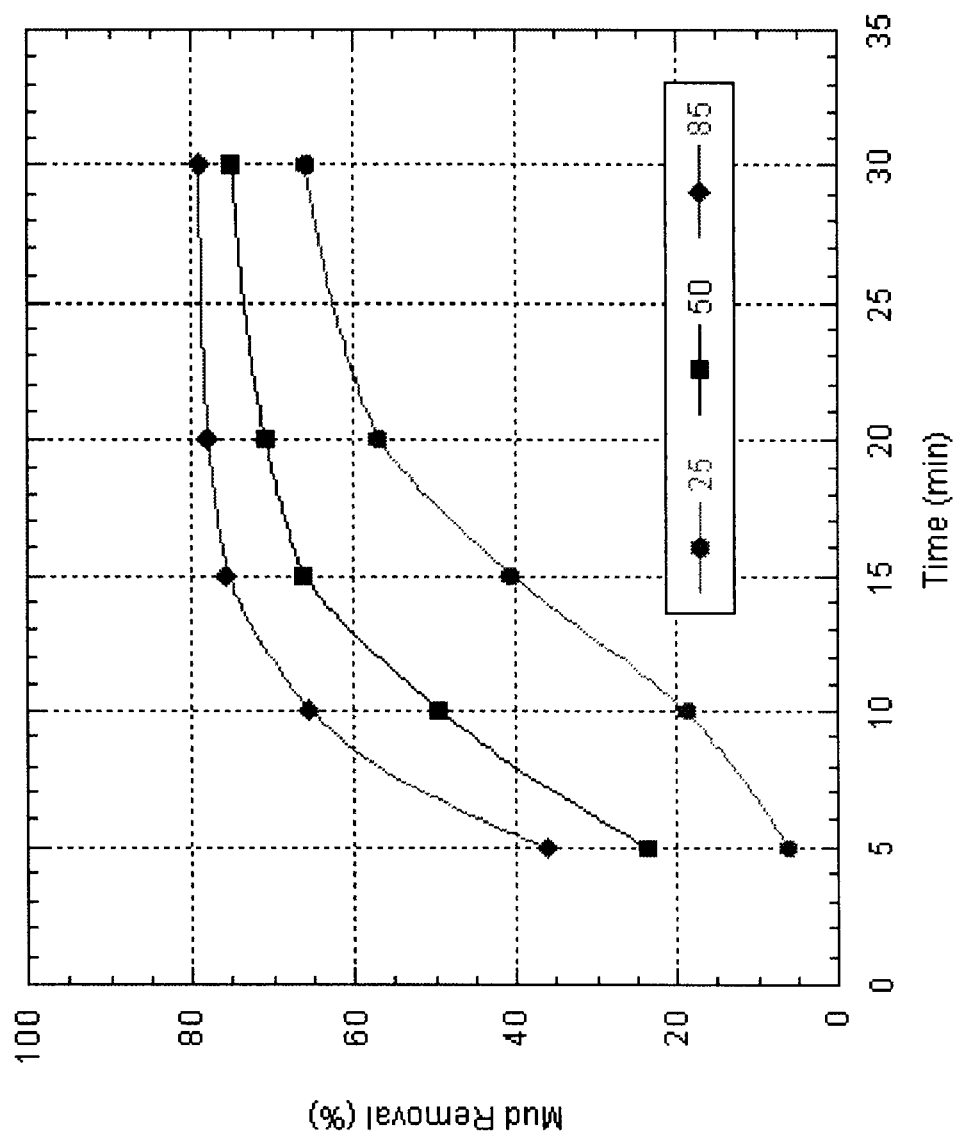

Table 5 shows the various solution bases tested to provide the data for FIGS. 19–21:

TABLE 5

| FIGURE | Mutual Solvent | Surfactant | OBM base | Solution | Temp. |
|---|---|---|---|---|---|
| 19 | IPM (75%) | A (18.75%), B (6.25%) | Linear α Olefin | (●) Water (■) Sea Water (♦) 10% NaCl | 85° C. |
| 20 | IPM (75%) | A (18.75%), B (6.25%) | Low toxic mineral oil | (●) Water (■) Sea Water (♦) 10% NaCl | 85° C. |
| 21 | IPM (75%) | A (18.75%), B (6.25%) | Ester | (●) Water (■) Sea Water (♦) 10% NaCl | 85° C. |

Table 6 shows the results of tests at different temperature to provide the data for FIGS. 22–25:

TABLE 6

| FIGURE | Mutual Solvent | Surfactant | OBM base | Solution | Temp. |
|---|---|---|---|---|---|
| 22 | IPM |  | Ester | Water | (●) 25° C. (■) 50° C. (♦) 85° C. |
| 23 | IPM | A | Ester | Water | (●) 25° C. (■) 50° C. (♦) 85° C. |
| 24 | IPM | B | Ester | Water | (●) 25° C. (■) 50° C. (♦) 85° C. |
| 25 | IPM (75%) | A (18.75%) B (6.25%) | Ester | Water | (●) 25° C. (■) 50° C. (♦) 85° C. |

What is claimed is:

1. A method of well treatment comprising the step of circulating a well treatment solution through a well before placement of a cement slurry therein, wherein the well treatment solution comprises a surfactant composition comprising at least one linear or branched chain $C_6$–$C_{10}$ alkylpolyglucoside in a solution of a mutual solvent selected from the group consisting of isopropyl myristate and rapeseed methyl ester.

2. A method as claimed in claim 1, wherein the well has been drilled using an oil-based drilling fluid.

3. A method as claimed in claim 1, wherein the surfactant composition comprises a single alkylpolyglucoside.

4. A method as claimed in claim 1, wherein the surfactant composition comprises more than one alkylpolyglucoside.

5. A method as claimed in claim 1, wherein the alkylpolyglucoside is selected from the group consisting of a $C_8$–$C_{10}$ linear alkylpolyglucoside, a $C_8$–$C_{10}$ branched chain alkylpolyglucoside, a $C_8$ branched chain alkylpolyglucoside, a linear $C_6$ alkylpolyglucoside, and combinations thereof.

6. A method as claimed in claim 1, wherein the ratio of alkylpolyglucoside to mutual solvent is in the range 1:3 to 3:1.

7. A method as claimed in claim 1, wherein the well treatment solution also comprises water.

8. A method as claimed in claim 7, wherein the water comprises sea water.

9. A method as claimed in claim 7, wherein the water comprises brine.

10. A method as claimed in claim 7, wherein the surfactant composition is present in the well treatment solution in an amount of 1%–10% by weight.

11. A method as claimed in claim 10, wherein the surfactant composition is present in the well treatment solution in an amount of about 5% by weight.

\* \* \* \* \*